V. HOLZAPFEL, Jr.
ELECTRIC BATTERY.
APPLICATION FILED JUNE 25, 1912.
1,132,846.
Patented Mar. 23, 1915.
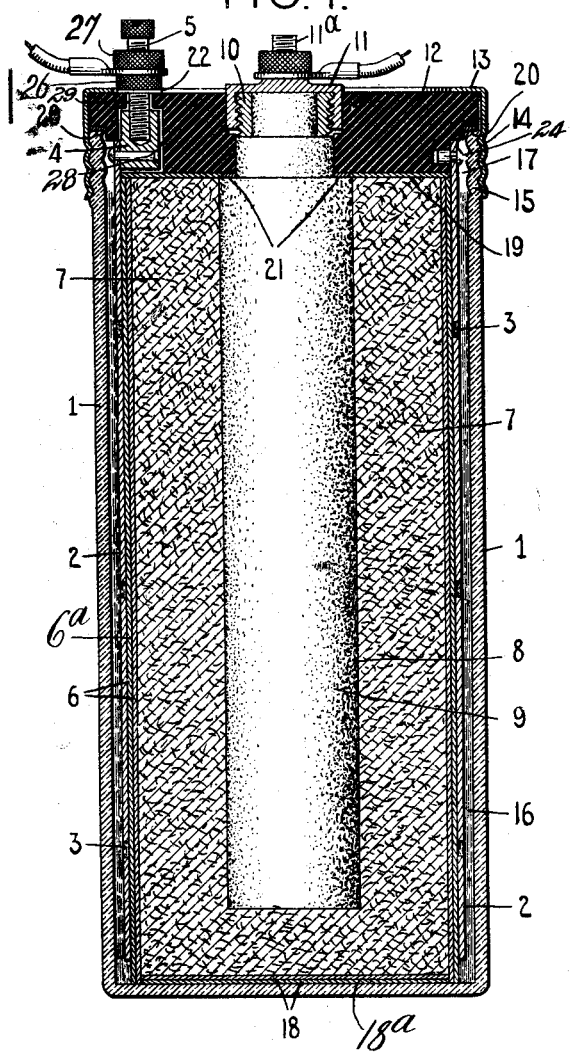
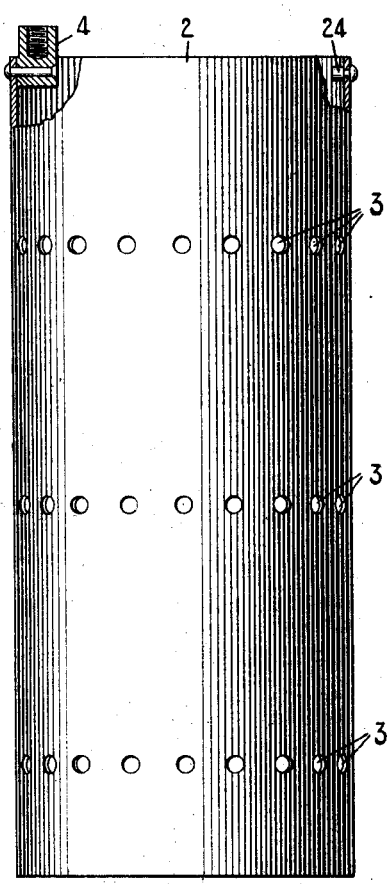
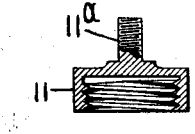
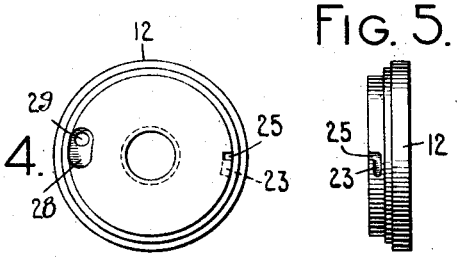
Witnesses:
John Waldheim
W Korstmann Jr
Inventor
Valentine Holzapfel Jr.
By his Attorney
Ant de Ronuvelle

UNITED STATES PATENT OFFICE.

VALENTINE HOLZAPFEL, JR., OF BAYONNE, NEW JERSEY.

ELECTRIC BATTERY.

1,132,846. Specification of Letters Patent. Patented Mar. 23, 1915.

Application filed June 25, 1912. Serial No. 705,703.

*To all whom it may concern:*

Be it known that I, VALENTINE HOLZAPFEL, Jr., a citizen of the United States, and a resident of Bayonne, in the county of Hudson and State of New Jersey, have invented certain new and useful Improvements in Electric Batteries, of which the following is a specification.

My invention relates to improvements in electrical generators, more particularly those known as semi-dry cells.

One of the objects of my invention is to provide a cell in which any of the parts can be replaced after becoming exhausted.

Another object is to provide a cell into which a liquid can be introduced when the charge therein becomes weak to again augment its capacity and prolong its period of action.

A further object is to provide a cell which is novel in construction and arrangement of parts.

I attain these objects as illustrated in the accompanying drawing in which—

Figure 1 is a vertical central sectional view of a cell exemplifying the invention, Fig. 2 is a view of the perforated zinc or positive electrode of the cell, Fig. 3 is a detail sectional view of a binding post, Fig. 4 is the cover of the cell, and Fig. 5 is a right hand view of Fig. 4.

The cell comprises a jar 1 preferably of glass, and a zinc or positive electrode 2 perforated as at 3 and having secured in any convenient manner at its upper end a hollow post 4, which receives a screw or binding post 5. Within the positive electrode 2 is contained an absorbent lining 6, preferably of two layers of blotting paper with a layer 6ª of paste between the accompanying faces. The blotting paper prevents short circuits between the zinc element and the depolarizer. Within this lining is contained a depolarizer 7 which is composed of powdered carbon and manganese dioxid, that is mixed with sal-ammoniac dissolved in a solution of paste and water. The mixture is molded to proper shape and dried, so that it can readily be introduced or taken out of the cell and when necessary replaced by a new one.

The depolarizer 7 is formed with a cavity 8 into which a carbon or negative electrode 9 is inserted. The carbon or negative electrode 9 is waxed or paraffined at its upper end, and is provided with a threaded metal ring 10 which receives the body portion 11 of a cup-like binding post having a shank 11ª. A cover 12 of insulating material is held in place by a second cover 13 on the jar 1. Screw threads 14 on the cover 13 engage screw threads 15 at the upper end of the jar 1. A liquid 16, preferably of sal-ammoniac and chlorid of zinc dissolved in water, is introduced within the space 17 between the jar 1 and the positive electrode 2, thereby increasing the efficiency of the cell. To allow this liquid to have free access to the depolarizer, perforations 3 are formed in the zinc. Two layers of blotting paper 18 with a layer of paste 18ª between them are located under the depolarizer and one layer 19 covers the same, to equally distribute the liquid over the depolarizer. To prevent leakage of any kind from the cell I have provided washers 20, 21 and 22. An elongated cavity 28 with a hole 29 at one end is formed in the cover 12 for the binding post 5. A right angled slot 23, 25 (see Fig. 5) is formed in the cover 12 and which locks with a supporting or locking pin 24 extending from the upper end of the positive electrode 2.

To attach the cover 12 to the positive electrode 2, it is placed over the end of the latter, so that the portion 25 of the right angled slot fits over the pin 24, while the elongated cavity 28 is located over the hollow post 4 of the positive electrode. The cover is then given a slight turn seating the pin 24 in the slot 23 and causing the hole 29 to register with the hole in the post 4. The binding post 5 with the necessary binding nuts 26 and 27 is then passed through the hole 29 in the cover, and threaded into the hollow post 4 of the positive electrode. In order to obtain access to the interior of the cell it is only necessary to remove the cover 13 when all of the interior can be lifted out by raising the cover 12, as the positive electrode 2 and carbon element are connected to said cover and the depolarizer snugly fits between the two. It will be observed that any part of the battery can be removed without disarranging any other part.

Having described my invention what I desire to secure by Letters Patent and claim is:

1. In a cell for a battery the combination of a positive electrode, a binding post and a supporting pin for said electrode, a cover having a hole for said binding post and a right angled slot in said cover to engage said pin.

2. In an electric battery of the character described the combination of a positive electrode and a negative electrode, a hollow post extending from the positive electrode, a locking pin extending from the positive electrode, a cover of insulating material having an elongated cavity with a hole adjacent to one end and having a right angled slot, the hole registering with the hollow post and the right angled slot locking with the locking pin and a binding post extending through the hole of said cavity and engaging said hollow post.

Signed at Bayonne in the county of Hudson and State of New Jersey this 15th day of June A. D. 1912.

VALENTINE HOLZAPFEL, Jr.

Witnesses:
PERCIVAL G. CRUDEN,
ANNA SHARKEY.